United States Patent

[11] 3,627,446

| [72] | Inventors | Jerry D. Wade;<br>Phillip H. Geisler, both of Galena, Kans. |
|---|---|---|
| [21] | Appl. No. | 33,588 |
| [22] | Filed | May 1, 1970 |
| [45] | Patented | Dec. 14, 1971 |
| [73] | Assignee | Wadler Manufacturing Company, Inc. |

[54] POND WATER AGITATOR
10 Claims, 3 Drawing Figs.

| [52] | U.S. Cl. | 416/171, 416/175, 416/203 |
|---|---|---|
| [51] | Int. Cl. | B01f 7/24 |
| [50] | Field of Search | 416/171, 175, 203 |

[56] References Cited
UNITED STATES PATENTS 3,373,821  3/1968  Sare .................... 416/175 X

*Primary Examiner*—Everette A. Powell, Jr.
*Attorneys*—Clarence A. O'Brien and Harvey B. Jacobson ABSTRACT: A wind-operated agitator, circulates water in ponds to prevent surface freezing during winter months. Upward flow of warmer water from the bottom of the pond is induced by rotation of an impeller connected to the lower end of a vertical shaft to which a wind vane assembly is secured above the water. A protective tubular housing encases the lower section of the shaft submerged in the water.

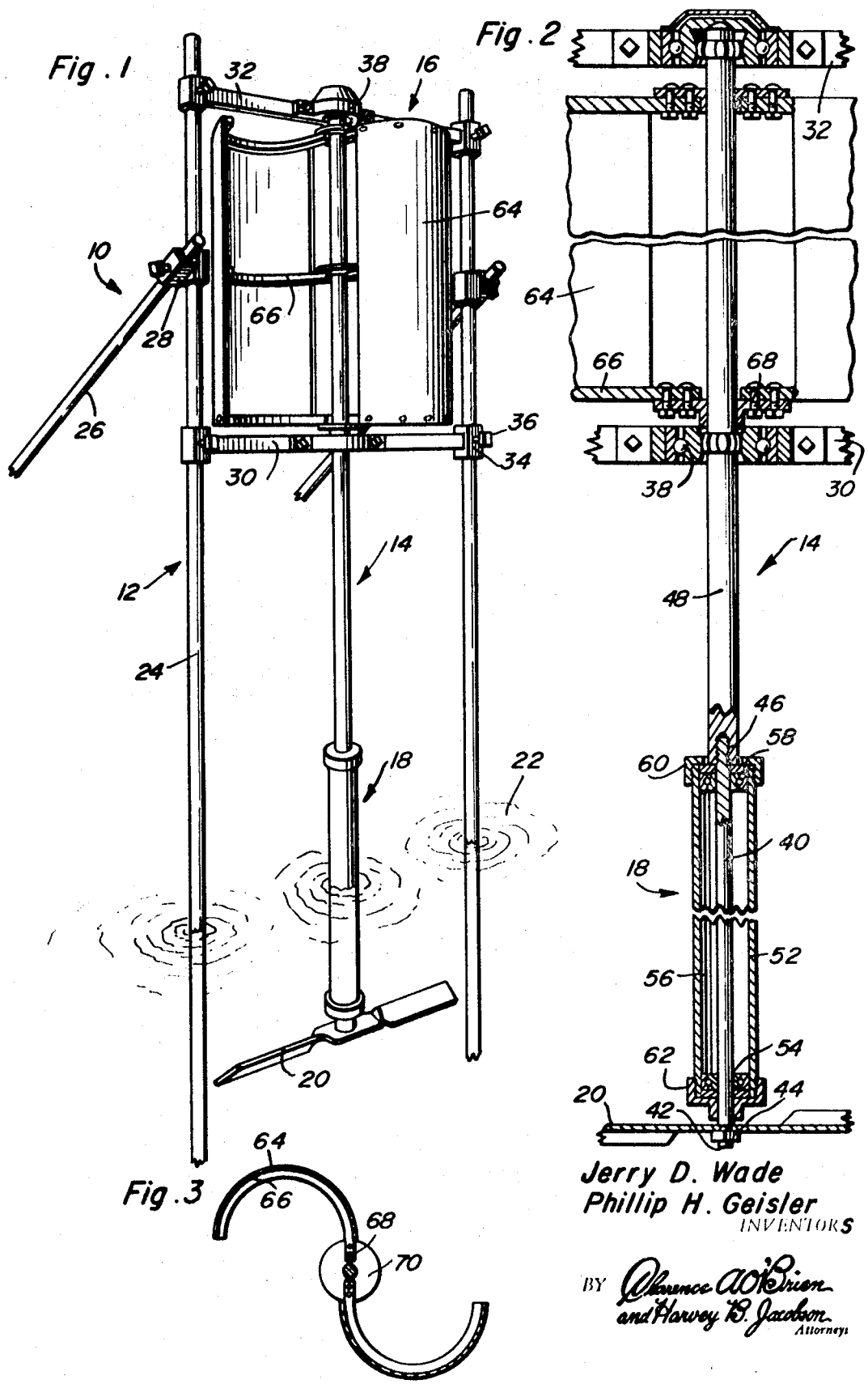

POND WATER AGITATOR

This invention relates to wind driven agitator devices for preventing surface freezing of exposed bodies of water such as ponds in order to maintain them available during winter months for water of livestock.

Wind driven agitators for pond water, are well known. Although such agitators are meant to be operative during freezing weather, and measures have been taken to prevent freezing of parts that would affect operation of the apparatus, breakdown does nevertheless occur as a result of extreme weather conditions. Further, in view of the extreme conditions to which such wind driven agitators are subjected, periodic and costly replacement of parts is required.

It is therefore an important object of the present invention to provide a wind driven agitator for pond water which is less likely to breakdown and require repair due to wear of parts. Further, an additional object is to provide a wind driven agitator which may be repaired with greater facility.

In accordance with the present invention, the pond water agitator is provided with a vertically elongated shaft assembly which includes a detachable lower section to which the impeller is connected at the lower end. The lower section of the shaft assembly is protectively enclosed within a tubular housing that is partially submerged in the water. The tubular housing is provided with bearings through which the lower section of the shaft extends and has sealed therewithin an antifreeze lubricant. The upper exposed section of the shaft is supported at vertically spaced locations by bearing assemblies on cross frame members adjustably mounted on posts forming the frame of the apparatus. A wind driven vane assembly is detachably secured to the upper section of the shaft between cross frame members. The vane assembly or wind motor includes vertically spaced hubs secured to the shaft to which arcuate ribs are connected and having vanes secured thereto. The tubular housing rotationally floats on the shaft so that there is little wear of the bearings therein. Only during extreme freezing weather when the tubular housing may become frozen to the surface of the water, will the shaft assembly rotate relative to the tubular housing under the power of the wind. The portion of the shaft assembly which projects into the water is thus protected at all times and free to transmit rotation to the impeller by means of which an upward flow of warmer water from the bottom of the pond is induced in order to prevent surface freezing of the pond particularly at the peripheral edges thereof where livestock watering occurs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view showing a typical installation for the pond water agitator of the present invention.

FIG. 2 is a partial vertical sectional view through the apparatus.

FIG. 3 is a top sectional view taken substantially through a plane indicated by section line 3—3 in FIG. 2.

Referring now to the drawings in detail, the pond water agitator generally denoted by reference numeral 10 includes a frame assembly generally referred to by reference numeral 12. The frame assembly rotatably supports a vertical shaft assembly 14 which is driven by a wind motor generally referred to by reference numeral 16. The lower portion of the shaft assembly 14 extends through a protective housing assembly 18 and at its lower end is connected to an impeller 20. As shown, the impeller is submerged within a body of water 22 which may be a pond by means of which livestock on a farm is watered.

The frame assembly includes a pair of vertical posts 24 anchored in the bottom of the pond and braced by a pair of rods 26 connected at an angle thereto and anchored in the earth at the bottom of the pond in spaced relation to the posts 24. The brace rods 26 are secured to the posts 24 at angularly and vertically adjusted positions by the fittings 28. Also interconnecting the posts 24 in vertically spaced relationship to each other, are a pair of cross frame members 30 and 32. Tubular fittings 34 are secured to the cross frame members and are adapted to be locked to the posts in adjusted positions by the setscrew fasteners 36. Self-aligning bearing assemblies 38 are secured to the cross frame members 30 and 32 in order to journal the shaft assembly 14 at spaced locations vertically spaced above the tubular housing assembly 18.

As more clearly seen in FIG. 2, the shaft assembly 14 includes a lower shaft section 40 protectively enclosed within the tubular housing assembly 18. The impeller 20 is fixedly held assembled on the lower threaded end 42 of the shaft section 40 by means of an assembly nut 44 while the upper end of the shaft section 40 is connected by any suitable means such as the joint 46 to a larger diameter, upper shaft section 48. The upper shaft section is journaled within the bearing assemblies 38 and is connected to the wind motor 16.

The tubular housing 18 includes a cylindrical member 52 mounting therewithin at the opposite axial ends, bearings 54. The space 56 within the cylindrical member 52 about the lower shaft section 40, is filled with an antifreeze lubricant. End seals 58 held assembled at the end portions of the cylindrical member 52 by the end caps 60 and 62, retain the lubricant within the housing assembly so as to provide all weather protection for the shaft section 40 encased therewithin.

The wind motor 16 includes two or more arcuate vanes 64. Each vane is reinforced on its concave surface by vertically spaced ribs 66 to which the vanes are secured by welding or riveting. Each rib 66 projects at its radially inner end from the vane and is secured by a pair of detachable fastener assemblies 68 to one of the vertically spaced hub members 70 rigidly secured to the upper section 48 of the shaft assembly. Thus, the vanes 64 are rigidly assembled on the shaft assembly but may be readily detached therefrom for replacement or repair purposes.

It will be apparent from the foregoing description, that the wind motor 16 may be readily repaired and will provide a source of power for rotation of the shaft assembly 14 rotationally supported in a vertical position by the bearing assemblies 38 located above and below the wind motor. The positions of the bearing assemblies 38 and the wind motor may be adjusted in accordance with different water levels. The lower section of the shaft assembly on the other hand which is partially submerged within the water, is protectively enclosed within the housing assembly 18. This housing assembly and the lower shaft section may also be readily removed for repair. However, a minimum amount of wear occurs on the bearings and seals since the housing assembly 18 may rotate with the shaft assembly except when it is frozen in at the pond surface. When the housing assembly 18 is so frozen, the shaft assembly may continue to turn relative thereto in order to impart rotation to the impeller 20 which is provided with a high-pitch design in order to upwardly move large quantities of water at a relatively low rotational speed. The antifreeze lubricant within the space 56 enclosed by the housing assembly helps to seal out water from the space which would otherwise freeze about the lower shaft section.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pond water agitator comprising a frame adapted to be anchored partially submerged in water, a shaft, an impeller connected to the shaft and adapted to be submerged within the water, a tubular housing partially enclosing the shaft in rotationally floating relation thereto above the impeller, bearing means mounted by the frame for journaling the shaft at locations vertically spaced above the tubular housing, and a wind motor connected to the shaft between said locations imparting rotation to the impeller.

2. The combination of claim 1 wherein said shaft includes a lower protected section within the housing to which the impeller is connected, an upper exposed section journaled by the bearing means, and means detachably interconnecting said lower and upper sections.

3. The combination of claim 2 including spaced bearings mounted within the tubular housing through which the shaft extends, antifreeze lubricant enclosed within the housing about the shaft and sealing means mounted on the housing retaining the lubricant therein.

4. The combination of claim 3 wherein said wind motor includes a plurality of arcuate vanes, a plurality of spaced hub members fixedly secured to the shaft, spaced ribs to which the vanes are secured, and fastener means detachably connecting the ribs to the hub members.

5. The combination of claim 4 wherein said frame includes a pair of posts, a pair of cross frame members on which said bearing means are mounted and means securing the cross frame members to the posts at vertically adjusted positions establishing said locations vertically spaced above the tubular housing at which the shaft is journaled.

6. The combination of claim 1 including spaced bearings mounted within the tubular housing through which the shaft extends, antifreeze lubricant enclosed within the housing about the shaft and sealing means mounted on the housing retaining the lubricant therein.

7. The combination of claim 1 wherein said wind motor includes a plurality of arcuate vanes, a plurality of spaced hub members fixedly secured to the shaft, spaced ribs to which the vanes are secured, and fastener means detachably connecting the ribs to the hub members.

8. The combination of claim 1 wherein said frame includes a pair of posts, a pair of cross frame members on which said bearing means are mounted and means securing the cross frame members to the posts at vertically adjusted positions establishing said locations vertically spaced above the tubular housing at which the shaft is journaled.

9. The combination of claim 8 wherein said wind motor includes a plurality of arcuate vanes, a plurality of spaced hub members fixedly secured to the shaft, spaced ribs to which the vanes are secured, and fastener means detachably connecting the ribs to the hub members.

10. The combination of claim 1, including means carried by the housing for floatingly supporting the housing on the shaft in spaced relation below the wind motor.

* * * * *